W. F: & W. R. JOHNSON.
BRIDLE BIT.
No. 29,284. Patented July 24, 1860.
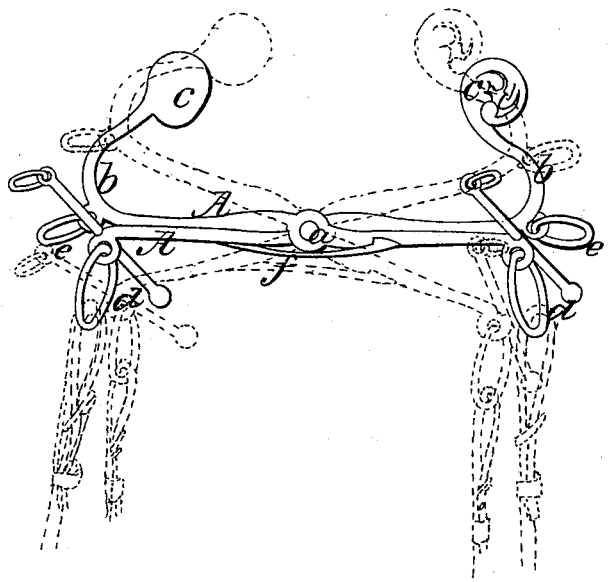
Witnesses:
R. S. Spurr
J. W. Coombs
Inventor,
W. F. Johnson
W. R. Johnson
Per Munn & Co
Atty's

UNITED STATES PATENT OFFICE.

W. F. JOHNSON AND W. R. JOHNSON, OF WETUMPKA, ALABAMA.

BRIDLE-BIT.

Specification of Letters Patent No. 29,284, dated July 24, 1860.

*To all whom it may concern:*

Be it known that we, W. F. JOHNSON and W. R. JOHNSON, both of Wetumpka, in the county of Coosa and State of Alabama, have invented a new and useful Improvement in Bridle-Bits; and we do hereby declare that the following is a full, clear, and exact description of the same, reference being had to the annexed drawing, making a part of this specification, said drawing being a perspective view of our invention.

This invention has for its object the restraining or controlling of vicious horses and other animals which are used with a bridle and bit by checking respiration. To this end we construct a bit of jointed cross bars, having at the end arms provided with buttons, which when the bit is adjusted in the mouth of the animal, will be just above the ends of the nostrils; the opposite ends of the cross bars having the reins attached. By this arrangement, as will be hereinafter fully shown and described, the buttons may at any time, by pulling sufficiently hard on the reins, be made to bear on the nostrils of the animal and close them thereby, effectually checking respiration and placing the animal under the complete control of the rider or driver.

To enable those skilled in the art to fully understand and construct our invention we will proceed to describe it.

A, A represent two bars of any suitable metal, which cross each other, and are connected by a joint or pin $a$, at their centers. These bars A, A, are of equal length, and to their front ends curved arms $b$, are attached one to each, said arms projecting forward and a little inward toward each other as plainly shown in the drawing. At the end of each arm $b$, there is a metal button $c$. These buttons may be formed by making the arms of proper length, flattening them and curling them spirally. They may however be made in other ways. The back ends of the bars A, have rings $d$, attached, to which the reins are secured. The front ends of the bars A, at their junction with the arms $b$, also have rings $e$, attached, to which other reins may be secured if desired.

To the back of one of the bars A, a spring $f$, is attached, and this spring bears against the other bar and has a tendency to keep the two bars closed or in contact with each other, the two bars when, the bit is used in the ordinary way, serving the same purpose as the usual bit-bar. This will be fully understood by referring to the drawing.

The arms $b$, are of such a length, and are so curved that when the bit is adjusted in the mouth of the animal, the buttons will be just above the ends or openings of the nostrils of the animal.

If the animal be manageable the bit, of course, operates in the usual way, the spring $f$, being sufficiently strong to prevent any casual movement of the bars A, on their joint $a$, and to permit the bit to be actuated by the reins attached to the rings $d$, for the ordinary purposes of guidance. The reins attached to the rings $e$, may also be used instead of those attached to the rings $d$, in cases where an animal is not disposed to be unruly. In case however of an animal running away or becoming restive or unmanageable, the rider or driver by pulling sufficiently hard on the reins, which are secured to rings $d$, to overcome the spring $f$, will force inward or toward each other the buttons $c$, $c$, as shown in red, and the same will press against the nostrils of the animal and check respiration, rendering the animal at once powerless and thereby placing him under the complete control of the rider or driver.

We are aware that appliances have been attached to bridle bits such as pads so arranged as to close the orifices of the nostrils and check respiration by pulling on the reins; but such devices so far as we are aware have proved inefficient, on account of an injudicious and complex arrangement of the parts. We do not claim, therefore, broadly the managing or controlling of vicious or unruly horses by checking respiration, without reference to the means employed for the purpose; but We do claim as new, and desire to secure by Letters Patent:—

A bridle bit composed of two bars A, A, crossed and connected by a joint or fulcrum pin $a$, provided with buttons $c$, $c$, and a spring $f$, to operate as and for the purpose set forth.

W. F. JOHNSON.
W. R. JOHNSON.

Witnesses:
A. BURROWS,
R. GREENE.